Aug. 14, 1945. E. GAMBO 2,382,474
INSULATION CLIP
Filed June 17, 1943
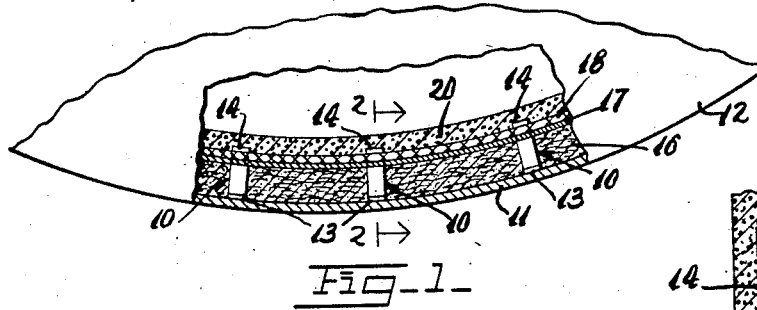
Fig_1_
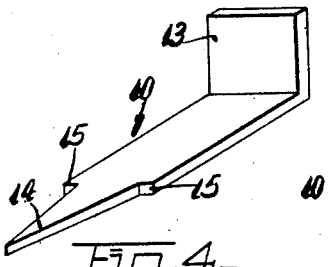
Fig_4_
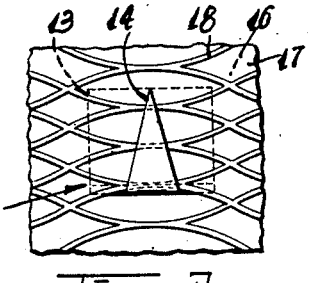
Fig_3_
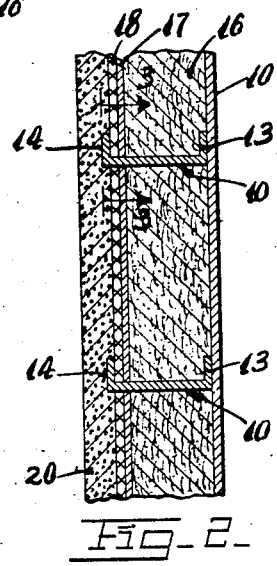
Fig_2_
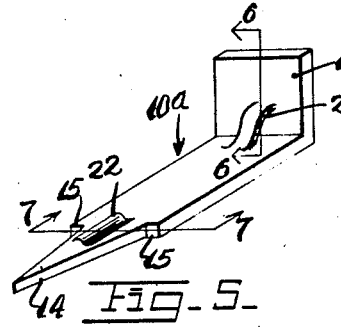
Fig_5_
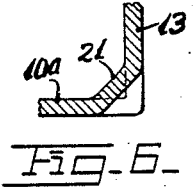
Fig_6_
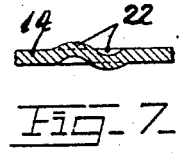
Fig_7_
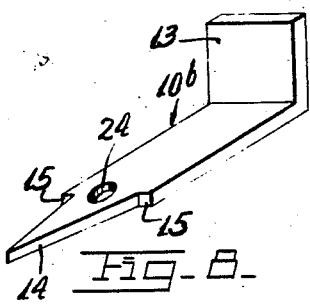
Fig_8_
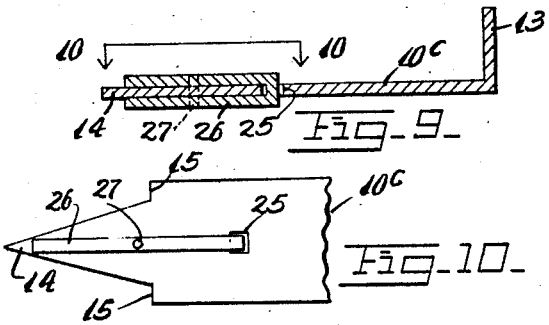
Fig_9_
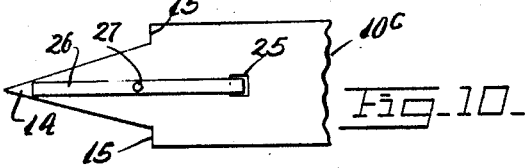
Fig_10_
INVENTOR.
Ernest Gambo
BY
Zoltan Polachek
ATTORNEY Patented Aug. 14, 1945

2,382,474

UNITED STATES PATENT OFFICE 2,382,474

INSULATION CLIP

Ernest Gambo, Staten Island, N. Y.

Application June 17, 1943, Serial No. 491,152

2 Claims. (Cl. 72—118)

This invention relates to new and useful improvements in a method for insulating ships and other structures, and more particularly, for clips for supporting the insulation material.

The new method is characterized by a plurality of insulation clips having pointed and bendable front ends and mounted on the wall of a ship or other object to be insulated. The method includes placing a layer of spun glass adjacent said wall or other object so that said clips project through said layer, and then placing layers of water-proof paper and metal lath against said layer of spun glass so that the pointed ends of the clips project through the latter two layers. The pointed ends of the clips are then bent laterally for holding the layers in position, and a hard finish composition material is then mounted on the lath.

It is proposed that the new insulation clip be characterized by a strip of metal having a right angle bent rear end forming a foot by which it may be mounted on a wall or other object, and the front end of said strip having a bendable pointed portion with shoulders at the sides against which the layers of waterproof paper and metal lath may rest.

The new method of insulating the clip is particularly adapted for insulating steel bulkheads. The new insulation will prevent thermal influence outside of the bulkhead from influencing the interior. This is a great advantage in cargo and other types of vessels.

The invention is also particularly useful for the insulation of certain types of refrigeration systems.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure—

Fig. 1 is a fragmentary plan view of a ship, with a portion broken away to disclose the interior construction, and constructed in accordance with this invention.

Fig. 2 is a fragmentary enlarged vertical sectional view taken on the line 2—2 of Fig. 1.

Fig. 3 is a fragmentary elevational view of Fig. 2 looking in the direction of the line 3—3 thereof.

Fig. 4 is a perspective view of one of the insulation clips illustrated, per se.

Fig. 5 is a perspective view of an insulation clip constructed in accordance with a modified form of this invention.

Fig. 6 is a fragmentary vertical sectional view taken on the line 6—6 of Fig. 5.

Fig. 7 is a vertical sectional view taken on the line 7—7 of Fig. 5.

Fig. 8 is a perspective view of a clip constructed in accordance with another form of this invention.

Fig. 9 is a longitudinal sectional view of still another clip embodying still another form of the invention.

Fig. 10 is a fragmentary plan view looking in the direction of the line 10—10 of Fig. 9.

The new method for insulating ships and other objects, in accordance with this invention, consists in mounting a plurality of insulation clips 10 in spaced positions on the wall 11 of a ship 12 or other object to be insulated. Each of these clips is formed from a strip of metal having a right angle bent rear end portion 13 forming a foot by which the strip may be mounted on said wall 11. The front end of said strip is provided with a bendable pointed portion 14 with shoulders 15 at the sides thereof.

The said strips 10 preferably are mounted on the wall 11 by welding the said foot portions 13 to the wall 11. A layer of spun glass 16 is placed against said wall 11 in a manner so that the clips 10 project through it. This layer is just pressed into position and the clips 10 will pierce through and extend through the openings. A layer of waterproof paper 17 is then placed against the spun glass 16 and pushed on to the pointed portions 14 of the clips 10. This waterproof paper may be waterproofed with a tar composition.

A layer of metal lath 18 is then pressed against the layer of waterproof paper 17 and is mounted on the pointed portions 14 of the clips 10. The pointed portions 14 are then bent at right angles to the main portions of the clips 10, as indicated clearly in Figs. 2 and 3, so as to clamp and hold the metal lath 18 and the waterproof paper 17 in position. A hard finish composition substance 20 is then mounted on the metal lath 18 in the usual way.

The hard finished composition substance is made of the following ingredients: about 50% white cement, 5% silica, 35% asbestos and about 10% white asphalt.

An important feature of the invention resides in the fact that the insulated wall will be efficient. Not only is there air entrapped between the wall 11 and the composition material 20, but the spun glass 16 also acts as a particularly good insulation substance. The insulated wall will be rigid and strong and very durable.

In Figs. 5 to 7 a modified form of clip 10ª has been disclosed which is very similar to the prior clip, distinguishing in the fact that the foot portion 13 and the main body portion of the clip are reinforced by a rib 21 which is pressed from the material of the clip at the junction of the portions mentioned. The base of the pointed portion 14 which bends when the pointed portion 14 is bent, is also reinforced with corrugations 22. In other respects this form of the invention is identical to the previous form and like parts have been given identical reference numerals.

In Fig. 8 still another modified form of clip 10ᵇ is disclosed which is very similar to the first form of clip, distinguishing in the fact that the strip from which the clip is formed is provided with an elongated opening 24 at the junction of the pointed portion with the main body of the clip. This opening 24 removes excess metal, making it relatively easy to bend the pointed portion while carrying out this new method.

In Figs. 9 and 10 another form of the invention is shown which is very similar to the first form of the invention, distinguishing in the fact that the clip 10ᶜ has a body portion formed with an opening 25 near the pointed portion 14. A strip of reinforcement material 26 is passed through the opening 25 and extends along the top and bottom faces of the pointed portion 14. This strip is secured on the pointed portion 14 by a spot weld 27. The strip 26 serves to reinforce the pointed portion 14 so that when it is bent into position to hold the metal lath it will form a rigid, strong holding member.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. An insulation clip, comprising a strip of metal having a right angle bent rear end forming a foot by which said strip may be mounted on a wall, the front end of said strip having a bendable pointed portion with shoulders at the sides, said clip having an opening at the base of said pointed portion, and a strip of reinforcement material laced through said opening and extending along the faces of said pointed portion and spot welded to said pointed portion.

2. An insulation clip, comprising a strip of metal having a right angle bent rear end forming a foot by which said strip may be mounted on a wall, the front end of said strip having a bendable pointed portion, said clip having an opening at the base of said pointed portion, and a strip of reinforcement material laced through said opening and extending along the faces of said pointed portion and spot welded to said pointed portion.

ERNEST GAMBO.